(12) United States Patent
Allan et al.

(10) Patent No.: US 8,045,570 B2
(45) Date of Patent: Oct. 25, 2011

(54) EXTENDED PRIVATE LAN

(75) Inventors: David Allan, Ottawa (CA); Liam Casey, Ottawa (CA)

(73) Assignee: Nortel Networks Limited, Mississauga, ON (CA)

(*) Notice: Subject to any disclaimer, the term of this patent is extended or adjusted under 35 U.S.C. 154(b) by 152 days.

(21) Appl. No.: 12/241,312

(22) Filed: Sep. 30, 2008

(65) Prior Publication Data

US 2010/0080238 A1    Apr. 1, 2010

(51) Int. Cl.
*H04L 12/28* (2006.01)
(52) U.S. Cl. .................................. 370/401; 370/395.5
(58) Field of Classification Search .................. 370/401, 370/395.53, 225, 357, 384
See application file for complete search history.

(56) References Cited

U.S. PATENT DOCUMENTS

| | | | |
|---|---|---|---|
| 7,693,164 B1* | 4/2010 | Busch et al. ................. | 370/401 |
| 2008/0170573 A1* | 7/2008 | Ould-Brahim ............... | 370/392 |
| 2008/0219268 A1* | 9/2008 | Dennison .................... | 370/395.2 |
| 2008/0247406 A1* | 10/2008 | Figueira et al. ............. | 370/401 |
| 2009/0054037 A1* | 2/2009 | Kaippallimalil ............ | 455/411 |
| 2009/0055898 A1* | 2/2009 | Kaippallimalil ............ | 726/3 |
| 2009/0225762 A1* | 9/2009 | Davidson et al. ............ | 370/401 |
| 2009/0274148 A1* | 11/2009 | Tremblay et al. ............ | 370/384 |

FOREIGN PATENT DOCUMENTS

WO   WO-2005/122025 A2   12/2005

OTHER PUBLICATIONS

IEFT Requests for Comments, No. 4664, Sep. 2006, pp. 1-37.
IEFT Requests for Comments, No. 4761, Jan. 2007, pp. 1-24.
IEFT Requests for Comments, No. 4762, Jan. 2007, pp. 1-26.
IEFT Internet Draft, "Radius/L2TP Based VPLS", Heinanen, J., Feb. 2003 pp. 1-7.

* cited by examiner

*Primary Examiner* — Hassan Kizou
*Assistant Examiner* — Emmanuel Maglo
(74) *Attorney, Agent, or Firm* — Barnes & Thornburg LLP

(57) ABSTRACT

A virtual private network is provided across a Provider Link State Bridging (PLSB) network between a first node connected to a private LAN and a second node connected to a roaming device. The roaming device is authenticated. A successful authentication results in a Service Identifier for the VPN being sent to the second node. Connectivity between members of the VPN service instance is maintained as part of the PLSB Link State process for forwarding table maintenance, rather than by any form of explicit signalling. A single Customer Virtual Bridge/Virtual Switch Instance can be located at the first node to provide point-to-point connectivity to each roaming device. A virtual Residential Gateway function can be combined with the Customer Virtual Bridge/Virtual Switch Instance.

22 Claims, 7 Drawing Sheets

EXTENDED PRIVATE LAN

FIELD OF THE INVENTION

This invention relates to providing a virtual private network across a provider network.

BACKGROUND TO THE INVENTION

Various forms of Virtual Private Networking (VPN) technologies allow a private network to be formed between geographically separate sites, using the resources of a provider network. Existing VPN technologies are primarily aimed at the enterprise sector, and connect sites of an enterprise. In addition they may allow home workers to access the network of their employer from their home office, or allow "road warriors" to access the network of their employer while travelling. A VPN can be established at networking Layer 2 or Layer 3.

One type of existing Layer 2 VPN technology is the Virtual Private LAN Service (VPLS) over MPLS as described in the Internet Engineering Task Force (IETF) Requests for Comments (RFCs), numbers 4664, 4761 and 4762. This provides Ethernet multipoint-to-multipoint communication over IP/MPLS networks. Geographically dispersed sites share the same Ethernet broadcast domain and traffic between the sites is carried by a full mesh topology of "pseudo-wires" between the sites. One of the difficulties of VPLS is that when a new end point connects to the network, there is a discovery process to discover all the other end points associated with the Virtual Private LAN service, followed by signalling to set up a mesh of service-specific pseudo-wires to serve the new end point. This can take some time to achieve, will have intermediate states where only partial connectivity is available, and will generate a significant amount of telemetry due to the inefficiency of utilizing an N-squared mesh.

The process of creating, and updating the topology of, a VPN is further complicated when it is necessary to support roaming communication users who can connect to various points in a provider network, with the connection points often being unknown in advance. A proposal "Radius/L2TP Based VPLS", Heinanen, J, <draft-heinanen-radius-l2tp-vpls-00.txt>, describes the use of a Remote Authentication Dial In User Service (RADIUS) server as a repository for a list of VPN sites. If a new site, called a Customer Edge (CE) request to join a VPN is granted, the provider network node that it is connected to, the Provider Edge (PE) learns the identifier of the Customer Edge (CE) VPN and IP addresses of the VPN's PEs. This still requires the new PE to establish an L2TP Control Connection with each of the other PEs of the VPN. While having some desirable characteristics for the desired service model, this approach focused primarily on discovery of endpoints via a central registration authority.

As noted above, existing VPN technologies are primarily aimed at the enterprise sector, and are typically considered too difficult, or inflexible, to be applied at a residential scale or with fulfillment times that render them undesirable for roaming users.

Some specialist applications exist for allowing a user to remotely access a device or application on a home network, while away from their home. One example is described in WO 2005/122025 A2 (Sling Media). A personal media broadcasting system allows video distribution from a media source in the home to a media player at a remote location over a computer network and allows a user to view and control the media source in the home over the computer network. These specialist applications typically require bespoke software on a device in the home network and on the roaming device, and require configuration of the home network's firewall to allow the application to communicate with the roaming device. These applications typically interface directly with Layer 3, with traffic being carried over the Internet.

The present invention seeks to provide an alternative way of providing a Virtual Private Network across a provider network.

SUMMARY OF THE INVENTION

A Provider Link State Bridging (PLSB) network provides an instance of a virtual private Ethernet switching service between a private LAN attached to a first node of the PLSB network and at least one roaming device attached to a respective second node of the PLSB network. The PLSB network comprises a control plane and a data plane. Data packets in the PLSB network carry I-SID identifiers to differentiate traffic of different network users. A virtual bridging function is provided at the first node. A first I-SID identifier is allocated to traffic of the virtual private Ethernet switching service instance in the PLSB network. A PLSB path labeled by the first I-SID is established between the virtual bridging function and each respective second node. The roaming device is authenticated for access to the virtual private Ethernet switching service. A successful authentication returns the first I-SID to the second node. The first I-SID is added to a list of I-SIDs to be advertised into the PLSB network by the second node. The first I-SID identifier is advertised into the PLSB network by the virtual bridging function and the second node. The advertising is via the control plane of the PLSB network. A PLSB path is established by the PLSB control plane in response to the advertising. The roaming device is bound to a PLSB UNI interface at the second node using the first I-SID. Traffic is bridged at the virtual bridging function between the private LAN and the PLSB path to each second node.

The instance of a virtual private Ethernet switching service can also be considered as an Ethernet virtual private network (VPN) service which connects devices on the private LAN to the roaming device, or devices. Effectively, this creates an Extended Private LAN.

Roaming devices are authenticated before joining the instance of the virtual private network service. Use of Provider Link State Bridging (PLSB) simplifies the process of updating the connectivity of the virtual private network as an authenticated roaming device connects to a network access point or disconnects from a network access point. One advantage is that connectivity between members of a particular VPN is maintained as part of the PLSB Link State process for forwarding table maintenance, and does not require any form of explicit signalling or additional endpoint discovery procedures. This can allow a large number of VPNs to be formed at any time, such as providing a VPN for each private premises. It can also allow newly authenticated roaming devices to be added to a VPN on demand, in real-time, or near-real time, even across large provider networks and in situations where a roaming device connects to a network access point which that device has not used before.

Advantageously, PLSB provides for a number of embodiments of VPN connectivity. The simplest and most scalable is to provide a single virtual bridging function for each virtual private network instance, and to locate the virtual bridging function at the first node of the PLSB network. The virtual bridging function serves as a hub and each PLSB path to a respective second node is a point-to-point connection or 'spoke'. Each VPN instance therefore has a simple hub-and-spoke topology. This can significantly help to scale the number of supported VPNs. There can be a single roaming device, or multiple roaming devices. A single roaming device obviates the need for multicast state to be installed for the VPN. More complex network based connectivity models are possible with PLSB, elaborated upon further in the description.

End-to-end Layer 2 (Ethernet) connectivity is particularly advantageous as it allows Ethernet "plug and play" behaviour between devices on the private LAN and any roaming device. The Layer 2 connectivity between the roaming device and the devices connected to the private LAN allow the devices to discover one another by broadcasting conventional messages over the virtual private network, without requiring complex protocols or assistance from other network entities.

The functionality described here can be implemented in software, hardware or a combination of these. The invention can be implemented by means of hardware comprising several distinct elements, and by means of a suitably programmed computer. Accordingly, another aspect of the invention provides software for performing any of the steps of the method. The software comprises instructions which, when executed by a processor, cause the processor to perform the described method. The software may be tangibly embodied on an electronic memory device, hard disk, optical disk or any other machine-readable storage medium. The software may be delivered as a computer program product on a machine-readable carrier or it may be downloaded to a node of the network via a network connection.

BRIEF DESCRIPTION OF THE DRAWINGS

Embodiments of the invention will be described, by way of example only, with reference to the accompanying drawings in which.

DESCRIPTION OF PREFERRED EMBODIMENTS

Figure 1:
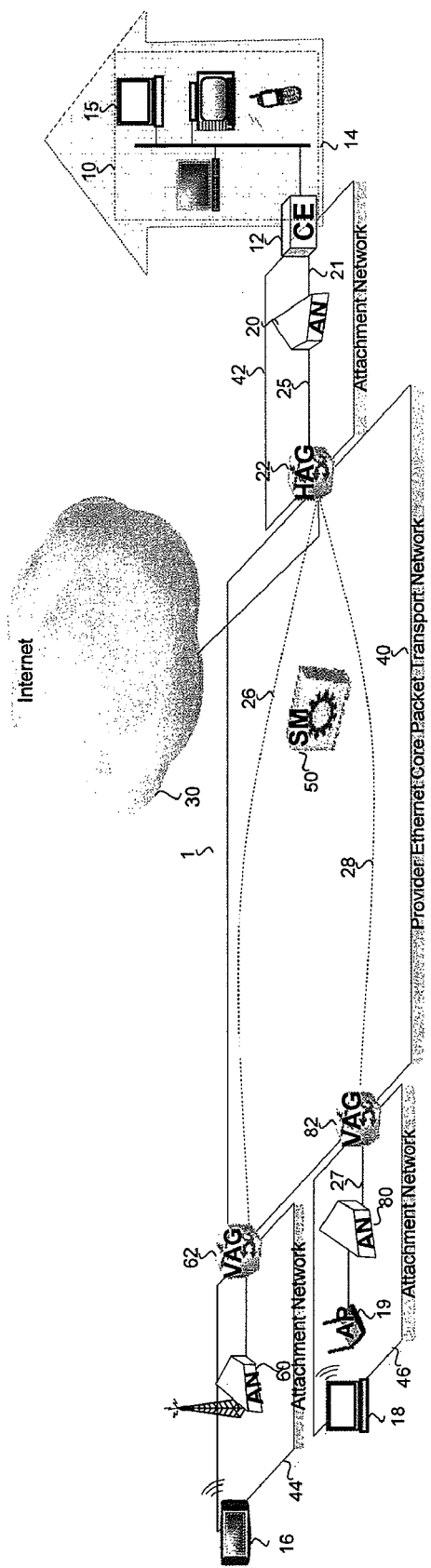
FIG. 1 shows an embodiment of an Extended Private LAN, being the extension of a residential LAN across a provider network to include two roaming devices.

FIG. 1 shows a provider network 1 in accordance with an embodiment of the invention. The provider network 1 comprises a core network 40 and attachment networks 42, 44, 46. A communications subscriber has a private LAN network 10 at a premises 14, such as a home, office or other site. In a conventional manner, the private LAN network 10 comprises a wired or wireless Ethernet-based distribution network which connects devices 15. Devices 15 can include: a communication device; a server which stores music, video, digital images or any other form of media content; a broadcast receiver; a Personal Video Recorder (PVR); a printer; a home appliance; a security system; a home environment control system (e.g. controlling lighting, heating etc.) or any other device which is capable of being connected to the network.

In embodiments of the invention, an Extended Private LAN service is provided which has the effect of extending the private LAN 10 across the provider network 1 to roaming devices 16, 18 connected to access points of the provider network.

A Customer Edge (CE) device 12 interfaces between the Private LAN network 10 and an Attachment Network 42 by way of a first mile broadband connection 21. The CE has the functionality of an Ethernet Bridge or Switch. The broadband connection 21 can use Digital Subscriber Line, Passive Optical Network (PON), cable, or any other suitable broadband access technology. An Access Node (AN) 20, e.g. a Digital Subscriber Line Access Multiplexer (DSLAM), may terminate the first mile broadband media 21 and map the traffic from the CE 12 onto an attachment virtual circuit (avc) in a packet trunk 25. The packet trunk 25 can transport the aggregation of many avcs between the AN 20 and an Attachment Gateway (AG) 22. Node 22 serves as a gateway to a Layer 2 provider network 40 and may also offer access to Layer 3 networks, such as the Internet 30. In an embodiment, the node 22 can serve as the Hub for the Extended Private LAN service for the private LAN network 10 and is thus designated as a Hub Attachment Gateway (HAG). A virtual bridging function is hosted by the HAG for traffic to/from the private LAN network 10.

A Layer 2 provider network 40 interconnects a large number of nodes 22, 62, 82. The Layer 2 provider network 40 will be described in more detail later. In a preferred embodiment the Layer 2 provider network 40 is an Ethernet-based network which supports Provider Link State Bridging (PLSB). PLSB is described in WO 2007/03856A1. Traffic is carried across Layer 2 provider network 40 in encapsulated form, such as MAC-in-MAC (IEEE 802.1ah), with encapsulation being applied at node 22 and removed at a destination edge node, such as one of nodes 62, 82. The use of encapsulation constrains the range of MAC addresses that are required within the provider network and also helps to constrain the area over which PLSB is required to operate. Roaming devices 16, 18 can connect to the Layer 2 provider network 40 by way of (other) Attachment networks 44, 46. Each Attachment Network 44, 46 connects to the Layer 2 provider network 40 via a respective Visited Attachment Gateway (VAG) 62, 82. Each VAG 62, 82 performs the same traffic encapsulation/de-encapsulation functions as described above for the HAG 22. Roaming devices 16, 18 can connect to Attachment Networks 44, 46 via access points. Access points may be provided in public areas, such as hotels and airports, and can comprise wireless LAN access points (APs) 19 or can be made over public wireless networking technologies, such as WiMAX, using attachment networks 60. More generally, a roaming device can form a connection to Layer 2 provider network 40 via any suitable access point. Roaming devices 16, 18 can comprise portable devices which support wireless access, such as WiFi, WiMAX or any other suitable wireless access technology, or they can use a wired connection, and protocol, to connect to the access point. Attachment to the provider network 40 is governed by an attachment network-specific Access Node 60, 80 that includes an Authenticator Function. Those skilled in the art will recognise that the location and operation of the Authenticator Function varies depending on the first mile technology of the Attachment Network. Each Attachment Network 44, 46 can transparently carry Ethernet traffic to the provider's core network 40.

Roaming devices 16, 18 will have a relationship with a private local area network 10. For example, the roaming device 16, 18 may comprise a portable computer or game machine and may belong to the owner of the private network 10, or one of their family members, or roaming device 16, 18 may belong to an employee of the office at which the private LAN 10 is located. When a roaming device 16, 18 attempts to connect to a Visited Attachment Gateway (VAG) 62, 82 of the provider network 40, the device is authenticated (see FIG. 4). In an embodiment of the invention, if the device is successfully authenticated spoke connectivity 26, 28 is formed between the VAG 62, 82 of the Attachment network 44, 46 and the HAG 22 so that all packets from the device 16, 18 are transported to the HAG virtual bridge function (FIG. 2, 210) which forwards traffic to the private LAN 10.

The process of connecting the device 16, 18 to the virtual local area network includes a step of associating, or "binding", a Service Identifier of the extended private LAN to the access point, or port, of the Layer 2 provider network 40 that the device 16, 18 has connected to. In a PLSB network this point can be described as a PLSB User-Network Interface (UNI). The Layer 2 provider network 40 is then updated to add the port where the roaming device has attached to the network to the community of interest identified by the Service Identifier(s) via establishing connectivity between the private network 10 and the port to which devices 16, 18 are connected to according to the multicast attributes associated with the service identifier(s). The roaming device 16, 18 can be identified using a shared secret, which is known to the roaming device and to the authentication function hosted in a Service Manager (SM) 52 located in the provider network 40.

PLSB permits multiple forms of connectivity to be established. The type of connectivity requested being a function of the multicast attributes associated with the network node 22, 62, 82, advertising interest in a specific Service Identifier. The actual multicast attributes are to: register no multicast interest, send interest and/or receive interest. For one realization of a simple hub and single spoke topology, no multicast capability is required of the PLSB network, so no interested is advertised. In another realization of the hub and spoke topology, particularly with lager number of spokes, two service instances are employed, the HAG 22 advertising send multicast interest in one and receive interest in the other, and the spokes, VAGs 62, 82, advertising the opposite arrangement. There is also a realization of an Ethernet VPN service where all end points advertise both send and receive interest with the end points all operating in "split horizon" mode.

In this way, dynamic membership changes to a virtual local area network 10 are established across the provider network 40 with a wide area of coverage. The virtual LAN can be considered as a personal LAN as the community of interest can be as small as a single residence and roaming devices belonging to family members of that residence. The Extended Private LAN connects the Private local area network 10 at the customer site and the roaming device 16, 18. In the simplest case, the Extended Private LAN connects a single private local area network 10 and a single roaming device, and this single hub and spoke connectivity is enforced by the lack of multicast attributes associated with the Service Identifier.

The preferred realization of the invention is not intended to connect Private local area networks at multiple premises (e.g. of family members and/or friends) into a single Extended Private LAN, although this can be achieved using the mechanisms described herein, especially where the multiple premises are connected by the same attachment network.

It is desirable that the process of connecting roaming devices to the Extended Private LAN network is performed with minimal complexity, both to the user of the roaming device 16, 18, and to the provider network 40. The use of PLSB is particularly advantageous in minimizing the overhead. In PLSB networks the Service Identifier used to identify each service is carried as the I-SID field, 180 (FIG. 8) of the 802.1ah Ethernet packets used within the provider network 40. In the context of a provider network, a service is typically the traffic of a particular enterprise or a particular telecommunications operator with which the carrier network has an agreement. The provider network encapsulates Ethernet packets at an edge node, and adds a further header 150, 160 (FIG. 7) for the purpose of routing the packet across the provider network. The encapsulation is removed from each packet at a destination edge node. The encapsulation also includes the I-SID 180. In the present invention, a unique Service Identifier is used to identify each Extended Private LAN, the Service Identifier being assigned in the first instance to the private LAN 10 and also being assigned to roaming devices 16, 18 as described below. Referring again to FIG. 1, the provider network 40 will connect to a large number of private LANs 10. Each Extended Private LAN has a unique I-SID to identify traffic forming part of that virtual private network.

Figure 2:
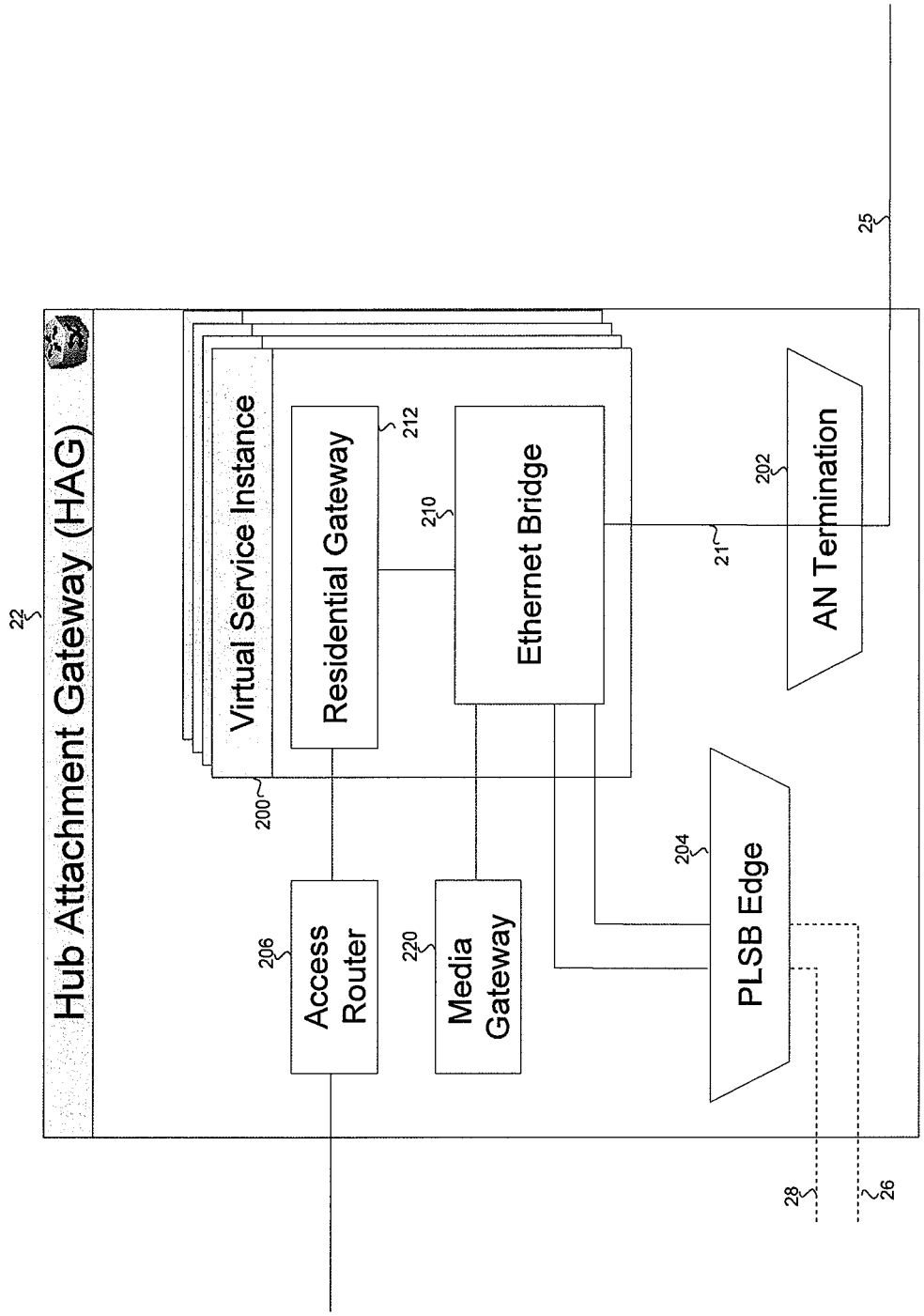
FIG. 2 shows the functionality associated with the Hub Aggregation Gateway (HAG) of FIG. 1.

The Extended Private LAN service is supported by functions performed at a HAG 22 which are shown in FIG. 2. Those skilled in the art will understand that although, for the purposes of clarity, the functions are depicted as separate entities, the functions can be realized in various other ways. Ethernet flows from the CE 12, are demultiplexed from the aggregate flow 25 by an Attachment Network Termination function 202 and fed to one of a plurality of Virtual Service Instances (VSIs) 200, there being a one-for-one match between Private LANs 10 and Virtual Service Instances 200. Specifically, the Ethernet flow from the Private LAN 10 is treated as a virtual port to an Ethernet Bridge function 210. Thus, the traffic flow to the private LAN 10 is a spoke to the bridge 210, which serves as a hub. A PLSB Edge function 204 de-encapsulates Ethernet Packets received from the provider core network 40 and encapsulates Ethernet packets entering the provider core network 40. Flows 26, 28 from the provider core network are delivered to the Ethernet Bridge function 210 by the PLSB Edge function 204. Each Ethernet packet carries an encapsulated I-SID. The PLSB Edge function 204 de-encapsulates packets from roaming devices 16, 18 and selects the VSI 200 that corresponds to the encapsulated I-SID.

In some embodiments of the invention there will be a Residential Gateway 212 function as part of the VSI 200, which can be realized as another spoke off of the Ethernet Bridge 210. The Residential gateway function 212 includes such functions as Firewalling and may also include Network Address translation (NAT) for traffic entering or leaving the Extended Private LAN. An Access Router (AR) function 206 is responsible for routing traffic to or from the Internet 30. As a further enhancement, the Service Provider can deploy virtualized servers, such as Media gateways 220, relating to services other than the Internet directly as spokes into the Ethernet Bridge 210. Media gateways 220 may provide services such as Internet Protocol Television (IPTV).

Figure 3:
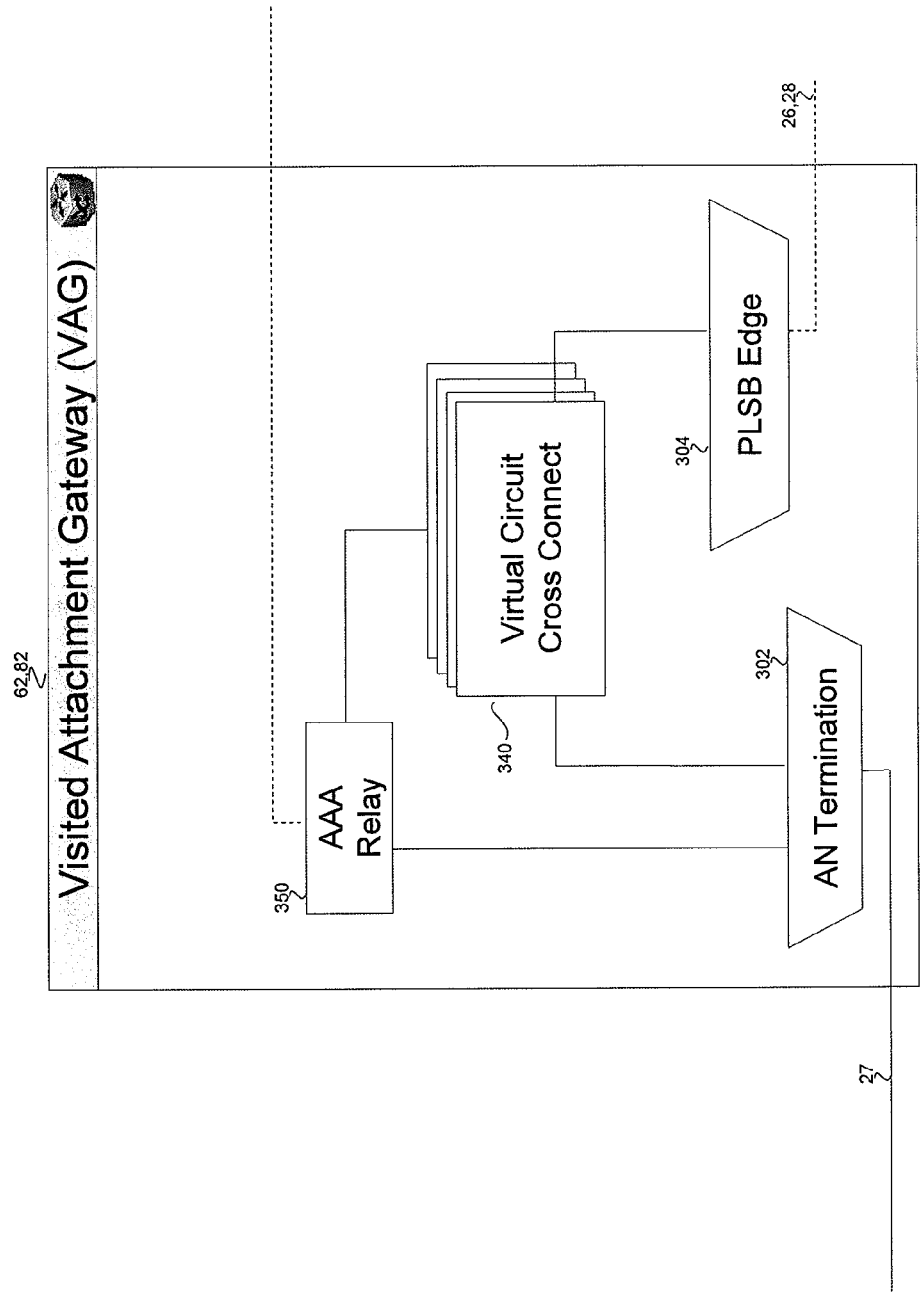
FIG. 3 shows the functionality associated with the Visited Aggregation Gateway (VAG) of FIG. 1.

FIG. 3 shows the functionality associated with the Visited Aggregation Gateway (VAG) in an Attachment Network. A PLSB Edge function 304 de-encapsulates Ethernet Packets received from the provider core network 40 and encapsulates Ethernet packets entering the provider core network 40. Ethernet flows from the Access Node are demultiplexed by an Attachment Network Termination function 302 and fed to a Virtual Circuit Cross Connect instance 340. Each Ethernet packet carries an encapsulated I-SID. The I-SID uniquely identifies traffic of a particular VPN. The PLSB Edge function 304 de-encapsulates packets received from the provider core network 40 and applies them to the instance of the virtual circuit cross connect 340 that corresponds to the encapsulated I-SID. The PLSB Edge function 304 interfaces to the PLSB control plane and, as will be described below, advertises when a new roaming device connects to the VAG. The Virtual Circuit Cross Connect maps traffic of a particular VPN (identified by an I-SID) to a virtual circuit leading to a port of an Access Node 60, 80 to which the roaming device 16, 18 of that VPN is connected. VAG 62, 82 also hosts an Authentication, Authorization and Accounting (AAA) Relay function 350 which participates in the authentication of roaming devices. A successful authentication of a roaming device which has connected to the VAG returns an I-SID for the VPN to which the roaming device should be connected. The I-SID is passed to the Virtual Circuit Cross Connect 340.

Once established, the extended Private LAN allows a roaming device to access devices 15 on the private network 10. The extended Private LAN provides end-to-end Layer 2 connectivity. This will allow a user to view digital images, listen to their music library and view video content such as video clips, movies or recorded television programmes. The Layer 2 connectivity between the roaming device and the devices connected to the home network allow the devices to discover one another by broadcasting conventional messages over the virtual LAN, without requiring complex protocols or assistance from other network entities. Stated another way, it allows "plug and play" behaviour between devices on the home network and any roaming device. To a user of the home network, the roaming device will appear to be another device connected directly to the home network. It is also possible for roaming devices to access other roaming devices in the same Extended Private LAN service instance for applications such as conferencing.

Figure 4:
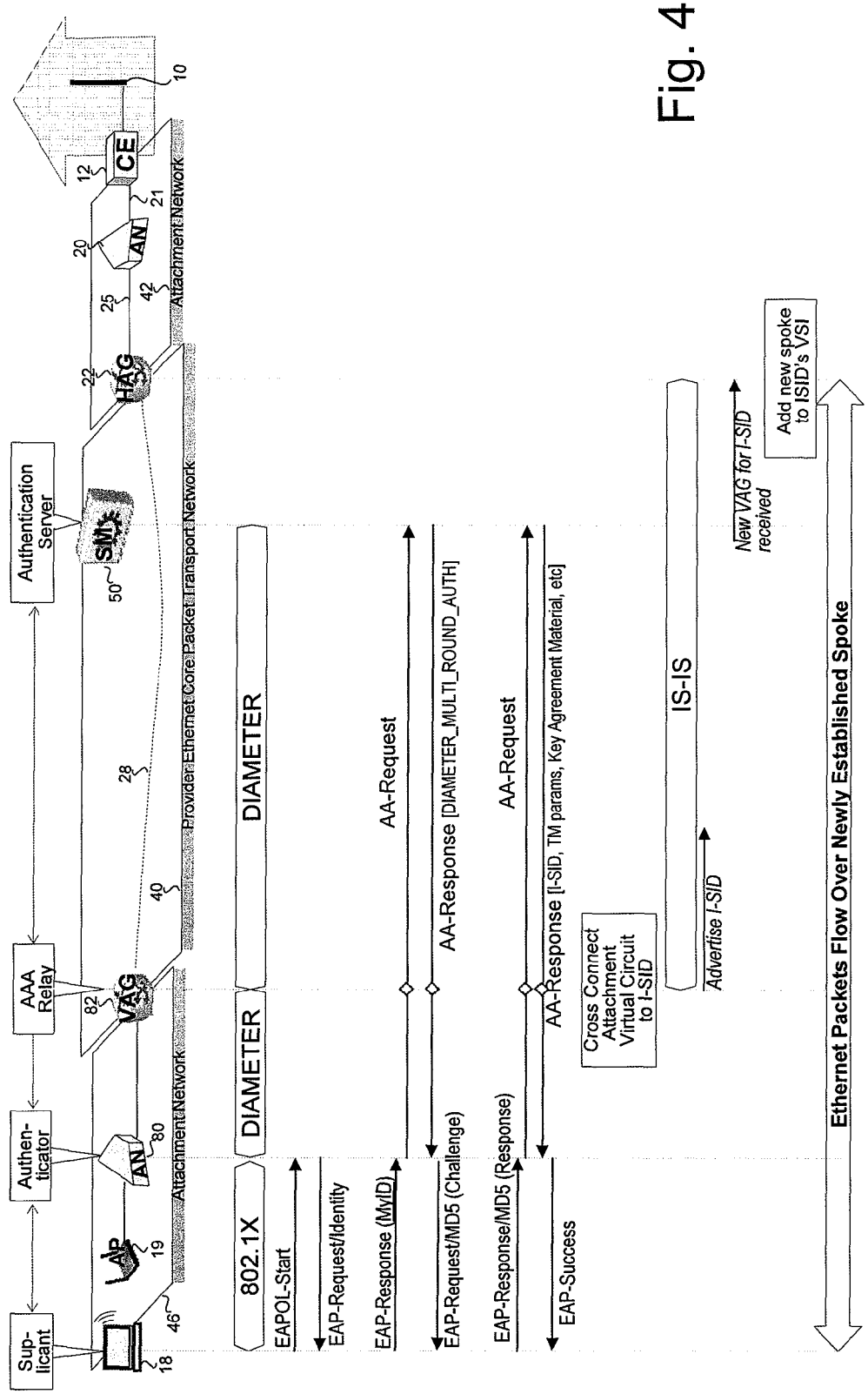
FIG. 4 shows a process of authenticating one roaming device to join an Extended Private LAN.

FIG. 4 shows the authentication and binding process which occurs when a roaming device 16, 18 attempts to connect to a port of the provider network 40. The steps shown in FIG. 4 are the steps for an IEEE 802.1x Extensible Authentication Protocol (EAP) authentication protocol although it will be appreciated that other authentication protocols can be used. The roaming device 16, 18 initiates the access by sending an "EAPOL-start" message towards the network. In the access network shown this message is received by the Access Point 19, which forwards it to the Authenticator, typically the Access Node (AN) 60, 80. The Authenticator replies with an "EAPOL-Request ID" message. The roaming device 16, 18 replies with an "EAP-Response (My ID)" message which identifies the roaming device. The Authenticator sends an AA-Request message, including the identity provided by the roaming device, towards the Authentication Server. The message passes first through the AAA relay function 350 (FIG. 3) at the VAG 62,82, which in turn forwards it over the provider core network 40 to the Authentication Server. The Authentication Server is typically part of the Service Manager 50. The Authentication Server responds with an AA-response which the Authenticator forwards as an "EAP-Request MD5(Challenge)". The roaming device replies with an "EAP-Request MD5(Response)", which is forwarded as a further AA-Request message. If the information provided by the roaming device is acceptable, the Authentication server responds with a set of parameters for the attachment of the roaming device to the network. These parameters, which are inspected by the VAG 62,82, include the service identifier (the I-SID in the preferred embodiment) corresponding to the Extended Private LAN service the device has been registered for, and the one to be used in establishing the required network connectivity, the multicast attributes suitable for the role of that port in the service instance. The parameters can also include traffic management parameters such as bandwidth limits. The I-SID for the newly authenticated device 16, 18 is locally associated by the VAG 62,82 with its port on the attachment network 46 that the device is connected to and on which it originated the authentication dialog. In the simpler embodiments, those that are pure hub and spoke this is achieved by using the Virtual Circuit Cross Connect (340, FIG. 3), which associates the I-SID for the private LAN service to the port to which the roaming device 18 is connected. (In more complex embodiments, a full PLSB adaptation function exists in lieu of the Virtual Circuit Cross Connect). The local node's interest in the I-SID including the multicast attributes (i.e. the interest of the port of the VAG 82, which is serving the roaming device to be connected to the VPN, in the I-SID of that VPN) is advertised throughout the provider network 40 using the control plane of PLSB, which is an Intermediate System-to-Intermediate System (IS-IS) mechanism. This allows nodes of the provider network 40 to update their forwarding databases with instructions which allow Ethernet packets to be forwarded between the other end systems in the Extended Private LAN, including those of the private network 10, and the new port serving the roaming device. The result of this process is a Layer 2 connectivity, end-to-end, between the roaming device and the private network 10, and any other end devices or services which share the same I-SID.

PLSB is an advantageous technology for the provider core network 40 in that it offers virtualization of bridged LAN segments in an efficient form, and eliminates unnecessary layers of indirection in how both the data plane and control plane works. This permits a simplified interface to the roaming infrastructure in that the Service Identifier returned by the Authentication Server can then be flooded into the IS-IS control plane of PLSB directly and the required service connectivity can be constructed in the amount of time it takes the network to converge.

An overview of relevant features of PLSB will now be given. A fuller description can be found in published Patent Application WO 2007/03856A1. Provider Link State Bridging (PLSB) enables Ethernet networks to be scaled from the LAN space to the WAN or provider network space by providing more efficient use of network capacity with loop-free shortest path forwarding. Rather than utilizing a learned network view at each node by using the Spanning Tree Protocol (STP) algorithm combined with transparent bridging, in a PLSB based network the bridges forming the mesh network have a synchronized view of the network topology. This is achieved via a link state routing system, specifically in the current realizations of PLSB, by the IS-IS routing system. The bridges in the network have a synchronized view of the network topology, have knowledge of the requisite unicast and multicast connectivity, can compute a shortest path connectivity between any pair of bridges in the network and individually can populate the forwarding information bases (FIBs) according to the computed view of the network. When all nodes have computed their role in the synchronized view and populated their FIBs, the network will have a loop-free unicast tree to any given bridge from the set of peer bridges; and a both congruent and loop-free point-to-multipoint (p2mp) multicast tree from any given bridge to the same set of peer bridges. The result is the path between a given bridge pair is not constrained to transiting the root bridge of a spanning tree and the overall result can better utilize the breadth of connectivity of a mesh.

PLSB provides the equivalent of Ethernet bridged connectivity, but achieves this via configuration of the FIB as a consequence of computation applied to the IS-IS topology database rather than flooding and learning. As such it can be used by emerging standards such as IEEE 802.1ah Provider Backbone Bridges (PBB) or MAC-in-MAC with configured forwarding of B-MACs (Backbone MAC) and trivial modifications to the PBB adaptation function, to map client broadcast behavior to PLSB multicast, such that client Ethernets can utilize the connectivity offered by the PLSB network without modification.

Figure 5:
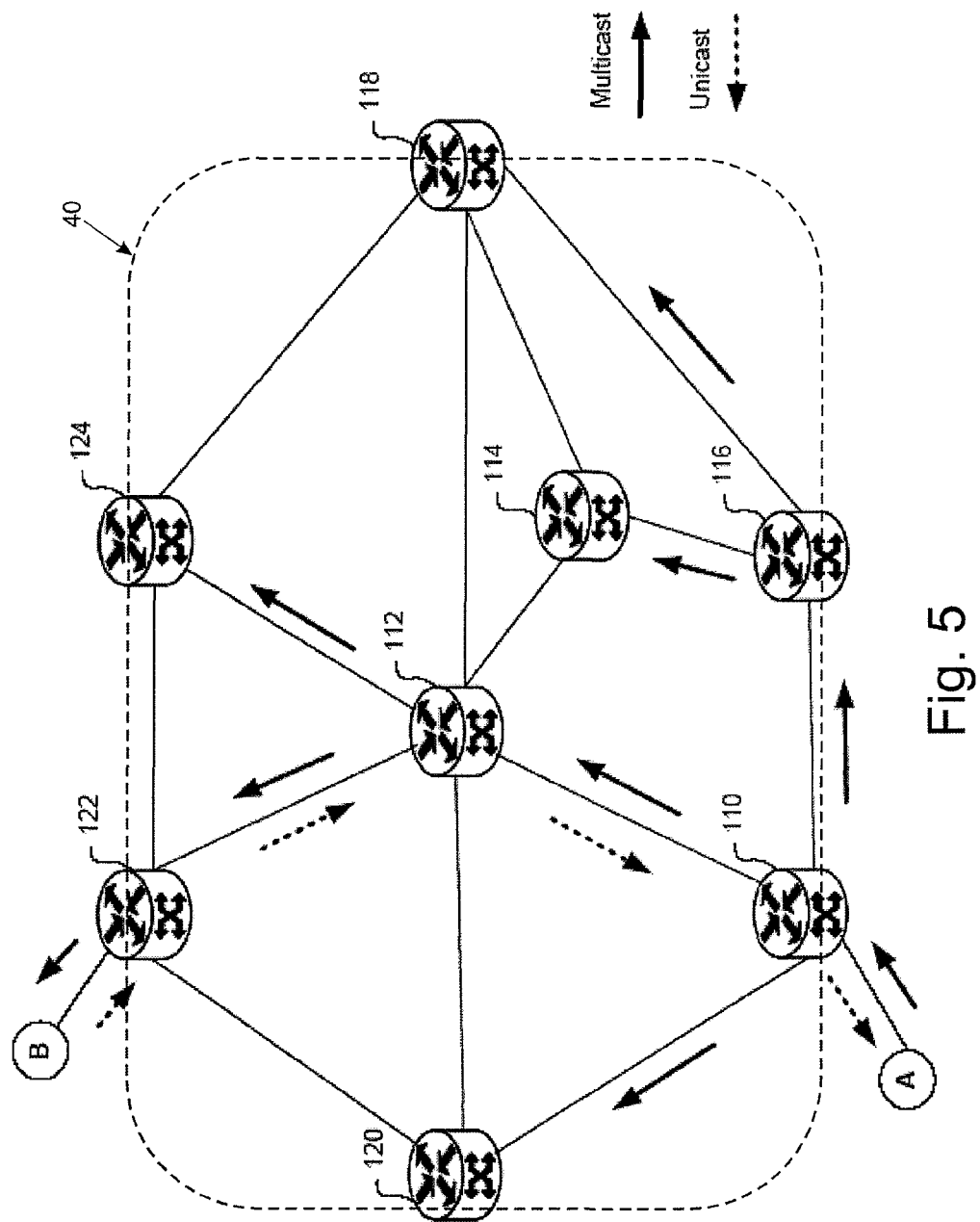
FIGS. 5 and 6 show an example of a provider network supporting PLSB which can used in FIG. 1.

FIG. 5 is a schematic representation of a network utilizing PLSB. From the shared network topology each node calculates optimal shortest paths to other provider backbone bridges (PBB) or nodes in the network using a shortest path algorithm. The outcome of the application of the shortest path algorithm across the network, and the corresponding population of the FIB in the bridges provides a unique tree through the mesh from each bridge to the member bridges of the network. As shown in FIG. 5, utilizing a shortest path algorithm allows a packet originating from device A to travel a more direct route to adjacent bridges 120 and 116. Transparent bridging operations of flooding and learning can be mapped onto PLSB by 802.1ah PBBs implementing PLSB. For example, if location of client device B is unknown to the bridge 110 in the PLSB network, packets addressed to B from A will be MAC-in-MAC encapsulated in a multicast packet by bridge 110 using the group address assigned to that bridge and with a source address of bridge 110. The multicast message traverses the network via the PLSB tree and a copy eventually arrives at node 122 where the MAC-in-MAC encapsulation is stripped and the copy forwarded to device B. The MAC-in-MAC transparent bridging function in bridge 122 observes the source B-MAC address in the MAC-in-MAC encapsulation and makes the association that to get to A it should be via bridge 110. Device B when replying to the message then sends a message addressed to "A" to bridge 122. Bridge 122 notes that the MAC-in-MAC destination for A is bridge 110 and wraps the message in a unicast packet addressed to bridge 110. The packet is sent through bridge 112 to bridge 110 which then strips the MAC-in-MAC encapsulation and forwards the packet on the correct port to reach device A. Similarly, bridge 110 observes that to reach B in the PLSB network it is via bridge 122. Any future messages sent from device A to device B and vice versa may now use learned unicast forwarding across the PLSB network.

An additional desirable property with respect to VPNs is that multicast connectivity is constrained to a set of bridges participating in a community of interest. The IEEE 802.1ah I-SID field is used to identify a community of interest. The community of interest identifier can also be incorporated into routing system advertisements so that nodes may identify interest in I-SID identified communities of interest, and each bridge associates a unique group multicast address with each I-SID advertised. A bridge that finds itself on the shortest path between two bridges installs the unicast MAC address(es) associated with each bridge, and the multicast MAC addresses for all I-SIDs common to the two bridges according to the advertised multicast attributes. The consequence of this is that a given edge bridge will have unicast connectivity to all peer bridges, and multicast connectivity unique to each I-SID identified community of interest. This will be in the form of being a leaf on a multipoint-to-point (mp2p) unicast tree to each peer, and being the root of an (S,G) point-to-multipoint (p2mp) multicast tree, where S is the address of the source and G is the multicast group address, to the set of peer nodes for each community of interest. If the bridge pair has no I-SIDs in common, a further refinement could be that no unicast MAC address is installed. Similarly the bridge pair may be transit bridges and have chosen not to offer any MAC information for flows either terminated or originated by the node. In this way, not only is multicast connectivity confined to specific groups of interest, the approach is frugal in consumption of forwarding table space for unicast connectivity. The I-SID is included in routing system advertisements.

Figure 6:
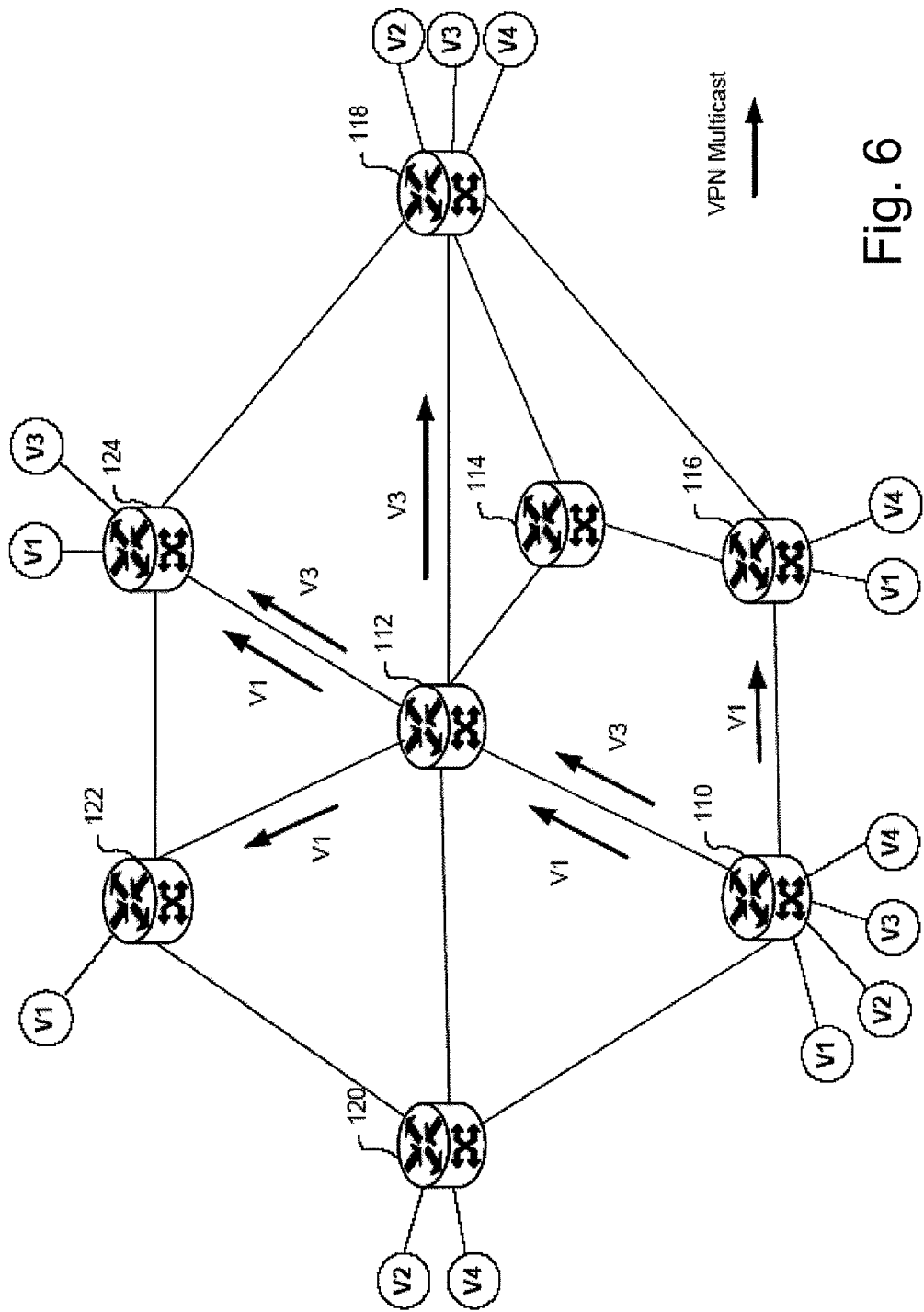

FIG. 6 shows how virtual private networks (VPN) can be mapped on top of the PLSB network allowing for a unique multicast tree to be mapped per VPN per edge bridge. In the multicast VPN scenario multicast traffic is only delivered to bridges participating in the VPN. VPN group multicast addresses are installed for the paths that are common. Four VPN networks are identified as V1, V2, V3 and V4. Each of these correspond to a virtual LAN between a customer site and a roaming device as shown in FIG. 1. Multiple VPNs can be hosted off a bridge, such as bridge 110, and can be individual VPN end devices. For each VPN, for example V1 and V3, unique multicast trees are created. Only routes to bridges containing end points of the corresponding VPN are identified. For example a routing tree for V1, paths to bridge 116 and between bridge 112 to bridge 122 and bridge 124 are required. Similarly, a routing tree for V3, paths to bridges 112 and onto bridges 118 and 124 are required. This eliminates the possibility that VPN traffic from V1 will be delivered to bridges not hosting VPN V1 or VPN V3 end devices. Each VPN may have a tree per edge bridge unique to the VPN based upon the shortest path algorithm.

Figure 7:
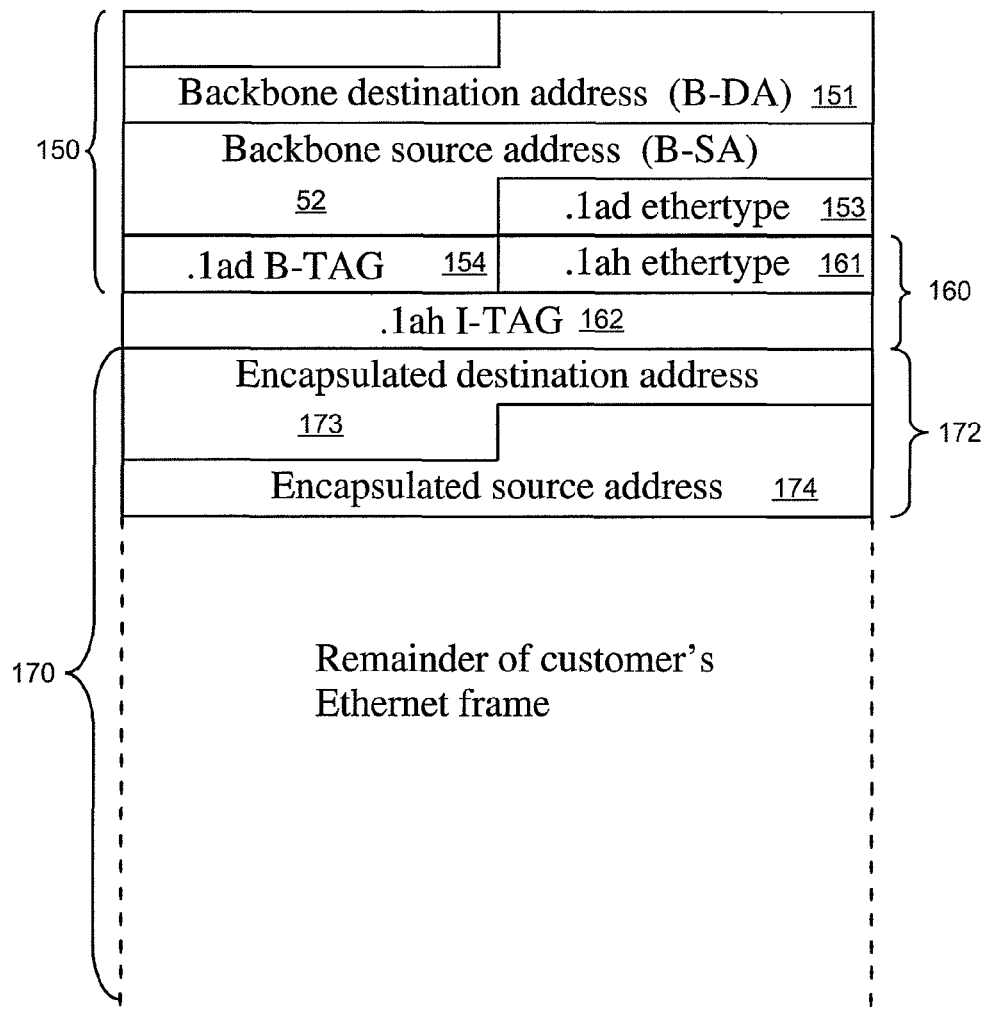
FIG. 7 shows the format of a MAC-in-MAC frame used across the provider network; and, FIG. 8 shows the location of a Service Identifier (I-SID) within the MAC-in-MAC frame of FIG. 7.
Figure 8:

For completeness, the format of a MAC-in-MAC data frame is shown in FIG. 7. The data frame begins with a header which comprises a backbone header 150, an IEEE 802.1ah encapsulation header 160 and the header 170 of the customer data frame. The header 170 of the customer data frame comprises an Ethernet header 172. The backbone header 150 begins with the Backbone Destination Address (B-DA) 151 and Backbone Source Address (B-SA) 52. These addresses will correspond to addresses of a port at which the traffic enters the core network (e.g. a port of switch 22 in FIG. 1) and leaves the core network (e.g. a port to which the roaming device is connected). An IEEE 802.1ad Ethertype field 153 precedes an IEEE 802.1ad B-TAG TCI field 154 which includes a VLAN tag, also known as a B-VID (Backbone VLAN Identifier). This is used to route the encapsulated frame within the provider network 40. Paths between nodes of the provider network are identified by a particular value of the B-VID field within the B-TAG. Next, the IEEE 802.1ah encapsulation header 160 comprises an IEEE 802.1ah Ethertype field 161, which declares that the frame is of type MAC-in-MAC. This is followed by a four byte Extended Service VLAN Tag (I-TAG) field 162, which uniquely identifies the individual customer service within the carrier network. Finally, the header carries the header of the encapsulated customer Ethernet data frame 170. This begins with the encapsulated Ethernet header 172, which comprises an encapsulated Destination Address 173 and an encapsulated Source Address 174. These addresses correspond to addresses of the customer/end-user and can correspond, for example, to nodes A, B in FIG. 1. FIG. 8 shows the IEEE802.1ah I-TAG in more detail, and shows that it carries the Service Identifier (I-SID) 180. Other parts of the I-TAG (not shown) include a priority indicator, and a drop eligibility indicator (DEI).

It has been described how Layer 2 connectivity is provided end-to-end. It is desirable to provide layer 3 access as well, either to a corporate network or to the public internet. In a conventional residential broadband access scenario, a residential gateway is provided in the home, with router and firewall functions, and this operates at Layer 3 and provides the requisite isolation of the home network from the untrusted Internet. To permit Layer 2 access, an alternative to the conventional residential gateway is required. One option is to move the usual Layer2/3 functions of the residential gateway to a node such as the Attachment Gateway 22. FIG. 2 shows a residential gateway function 212 which, together with an Access Router 206, provides access to Layer 3 networks such as the Internet 30. Another option is to provide separate Layer 2 and Layer 3 connections between the home network and the provider network.

With the topology shown in FIG. 1 it is possible to provide some new services, and it is possible to provide some conventional services in a more efficient manner. The provider network can host media stores and playout devices. Preferably, these are Universal Plug and Play (UPnP) compatible so that they can be "discovered" by any other devices in the network without requiring special configuration. Other services hosted by the provider network 1 include a switched digital broadcast tuner and a Video on Demand (VoD) server.

The availability of ubiquitous layer 2 connectivity with roaming enables a number of applications specific to the community of interest instantiated in the VPN. This is with respect to applications such as gaming, nailed up communication (known as push-to-talk), and intra community communications services ("family plans").

The invention is not limited to the embodiments described herein, which may be modified or varied without departing from the scope of the invention.

We claim:

1. A method of operating a Provider Link State Bridging (PLSB) network to provide an instance of a virtual private Ethernet switching service between a private LAN attached to a first node of the PLSB network and at least one roaming device attached to a respective second node of the PLSB network, the PLSB network comprising a control plane and a data plane, data packets in the PLSB network carrying I-SID identifiers to differentiate traffic of different network users, the method comprising:
    providing a virtual bridging function at the first node;
    allocating a first I-SID identifier to traffic of the virtual private Ethernet switching service instance in the PLSB network;
    establishing a PLSB path labeled by the first I-SID between the virtual bridging function and each respective second node by:
        detecting when a roaming device attaches to the second node of the PLSB network;
        authenticating the roaming device for access to the virtual private Ethernet switching service;
        sending the first I-SID to the second node upon a successful authentication;
        adding the first I-SID to a list of I-SIDs to be advertised into the PLSB network by the second node;
        advertising the first I-SID identifier into the PLSB network by the virtual bridging function and the second node, the advertising being via the control plane of the PLSB network, the PLSB path being established by the PLSB control plane in response to the advertising;
        binding the roaming device to a PLSB UNI interface at the second node using the first I-SID;
    bridging traffic at the virtual bridging function between the private LAN and the PLSB path to each second node.

2. The method according to claim 1 wherein the virtual bridging function at the first node is the only virtual bridging function for traffic of the virtual private Ethernet switching service instance, and all traffic is bridged by the single virtual bridging function.

3. The method according to claim 2 wherein the advertising by the second node comprises advertising no multicast interest and the control plane establishes a point-to-point path between the second node and the virtual bridging function.

4. The method according to claim 2 wherein the advertising by the virtual bridging function comprises advertising multicast interest, the multicast interest being selected from: (i) no multicast interest; (ii) multicast interest.

5. The method according to claim 1 wherein the advertising by the virtual bridging function and the second node comprises advertising multicast interest, the multicast interest for each node being selected from: (i) no multicast interest; (ii) the first node advertising send multicast interest while second nodes advertise receive multicast interest; (iii) all nodes advertise both send and receive multicast interest and operate according to split horizon rules.

6. The method according to claim 1 wherein the roaming device directly attaches to the second node of the PLSB network.

7. The method according to claim 1 wherein the roaming device attaches to the second node of the PLSB network via an attachment sub-network, and wherein authentication messaging for authenticating the roaming device is relayed by the second node.

8. The method according to claim 1 wherein the step of authenticating the roaming device uses a standard authentication protocol that has been adapted to return an I-SID.

9. The method according to claim 8 wherein the authentication protocol is one of: RADIUS, DIAMETER.

10. The method according to claim 1 further comprising:
    providing a Virtual Residential Gateway function as a virtual port attached to the virtual bridging function, the virtual residential gateway providing access to a Layer 3 network; and
    routing all traffic of the virtual private Ethernet switching service instance, which is destined for the Layer 3 network, through the Virtual Residential Gateway.

11. The method according to claim 10 wherein the Layer 3 network is the Internet.

12. The method according to claim 1 further comprising:
    providing a further service for any of: the private LAN and the at least one roaming device, the further service being provided as a virtual port attached to the virtual bridging function.

13. The method according to claim 12 wherein the further service comprises at least one of: video-on-demand, Voice over Internet Protocol (VoIP), Internet Protocol Television (IPTV).

14. The method according to claim 1 wherein the private LAN serves a private premises and the roaming device is a device associated with the private premises.

15. The method according to claim 14 wherein the private LAN serves a private residence and the roaming device is a device associated with the private residence.

16. In a Provider Link State Bridging (PLSB) network, a method of providing an instance of a virtual private Ethernet switching service between a private LAN attached to a first node of the PLSB network and at least one roaming device attached to a respective second node of the PLSB network, the PLSB network comprising a control plane and a data plane, data packets in the PLSB network carrying I-SID identifiers to differentiate traffic of different network users, a first I-SID identifier being allocated to traffic of the virtual private Ethernet switching service instance, the method comprising establishing a PLSB path labeled by the first I-SID between the virtual bridging function and each respective second node by, at the second node:
    detecting when a roaming device attaches to the second node of the PLSB network;

authenticating the roaming device for access to the virtual private Ethernet switching service;

receiving the first I-SID upon a successful authentication;

adding the first I-SID to a list of I-SIDs to be advertised into the PLSB network by the second node;

advertising the first I-SID identifier into the PLSB network by the second node, the advertising being via the control plane of the PLSB network, the PLSB path being established by the PLSB control plane in response to the advertising;

binding the roaming device to a PLSB UNI interface at the second node using the first I-SID.

17. A non-transitory computer readable medium on which is stored instructions which, when executed by a processor, cause the processor to perform the method of claim 16.

18. A Provider Link State Bridging (PLSB) network for providing a virtual private Ethernet switching service between a private LAN and at least one roaming device, the PLSB network comprising:

a first node through which a Private LAN can attach to the PLSB network;

at least one second node through which a roaming device can attach to the PLSB network;

a control plane and a data plane, data packets in the PLSB network carrying I-SID identifiers to differentiate traffic of different network users;

a virtual bridging function at the first node, with a first I-SID identifier allocated to traffic of the virtual private Ethernet switching service instance in the PLSB network;

an authentication function which is arranged to authenticate the roaming device for access to the virtual private Ethernet switching service when the roaming device attaches to the second node and which is arranged to send the first I-SID to the second node upon a successful authentication;

wherein the second node is arranged, upon a successful authentication, to advertise the first I-SID identifier into the PLSB network and the control plane is arranged to establish a PLSB path between the second node and the virtual bridging function in response to the advertising; and wherein the virtual bridging function is arranged to bridge traffic between the private LAN and the PLSB paths to the second nodes.

19. The Provider Link State Bridging (PLSB) network according to claim 18 wherein there is a single virtual bridging function at the first node for bridging all traffic of the virtual private Ethernet switching service instance.

20. The Provider Link State Bridging (PLSB) network according to claim 18 further comprising a Virtual Residential Gateway function attached to the virtual bridging function which is arranged to provide a gateway to a Layer 3 network for traffic of the virtual private Ethernet switching service.

21. In a Provider Link State Bridging (PLSB) network for providing an instance of a virtual private Ethernet switching service between a private LAN and at least one roaming device, the instance of the virtual private Ethernet switching service being allocated a first I-SID identifier, a node through which a roaming device can attach to the PLSB network, the node comprising:

a user-network interface (UNI) to which the roaming device can connect to the PLSB network;

a controller which is arranged to:

send authentication messaging for authenticating the roaming device for access to the virtual private Ethernet switching service;

receive the first I-SID upon a successful authentication;

add the first I-SID to a list of I-SIDs to be advertised into the PLSB network;

advertise the first I-SID identifier across the control plane of the PLSB network bind the roaming device to the UNI interface using the first I-SID.

22. The node according to claim 21 wherein the user-network interface is connectable to an attachment sub-network and the controller is arranged to relay authentication messaging from the attachment sub-network.

* * * * *